United States Patent

[11] 3,613,736

| [72] | Inventor | Masayoshi Kuwabara<br>Yokohama, Japan |
|---|---|---|
| [21] | Appl. No. | 881,468 |
| [22] | Filed | Dec. 2, 1969 |
| [45] | Patented | Oct. 19, 1971 |
| [73] | Assignee | Bridgestone Tire Company Limited<br>Kyobashi, Chuo-ku, Tokyo, Japan |
| [32] | Priority | Dec. 4, 1968 |
| [33] | | Japan |
| [31] | | 43/105186 |

[54] STRANDED WIRE REINFORCED FLUID TRANSPORTING HOSE
3 Claims, 4 Drawing Figs.

[52] U.S. Cl. ................................................ 138/109, 285/149
[51] Int. Cl. .................................................. B32b 31/00, F16l 9/00
[50] Field of Search ........................................ 138/109, 132, 125, 129; 285/149

[56] References Cited
UNITED STATES PATENTS

| 2,747,616 | 5/1956 | Ganahl .......................... | 138/132 X |
| 2,833,313 | 5/1958 | Penman .......................... | 138/125 |
| 2,837,354 | 6/1958 | Thibault et al. ................ | 285/149 |
| 2,911,236 | 11/1959 | Thibault ........................ | 285/149 |
| 3,117,597 | 1/1964 | Fritz et al. ..................... | 138/125 |
| 3,119,415 | 1/1964 | Galloway et al. .............. | 138/109 X |
| 3,295,557 | 1/1967 | Christiansen .................. | 138/109 X |
| 3,495,627 | 2/1970 | Pierpont, Jr. .................. | 138/109 |
| 3,528,457 | 9/1970 | Martin et al. .................. | 138/132 |

*Primary Examiner*—Henry K. Artis
*Attorney*—Stevens, Davis, Miller & Mosher

ABSTRACT: A stranded wire reinforced fluid-transporting hose comprising a plurality of stranded wires consisting of a plurality of wire elements having its diameter about 0.1 to 0.5 mm. and extending along the axial direction of the hose. One element of the hose is provided with metal flanges at the both ends for series connection. The hose element is particularly suitable in a use of jointing a hose line to a tanker ship or a buoy in a transporting system of fluid, such as oil, by a reason of its high flexibility and its large tensile strength.

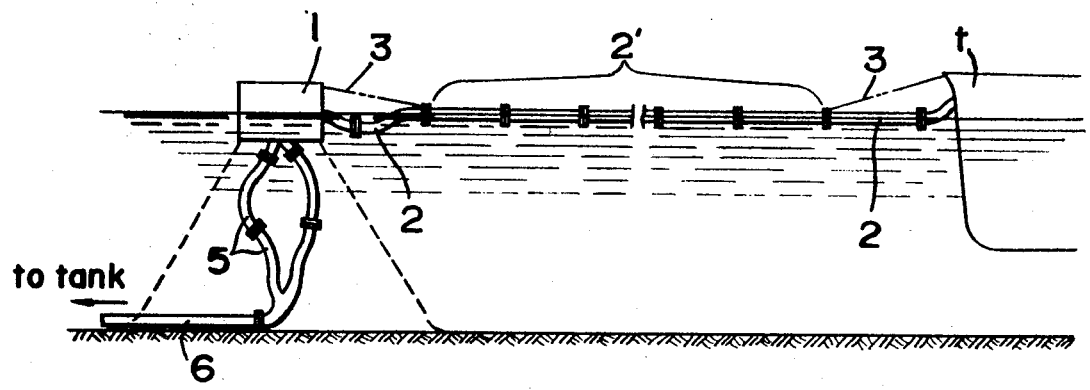
FIG_1

PATENTED OCT 19 1971 3,613,736
SHEET 2 OF 2
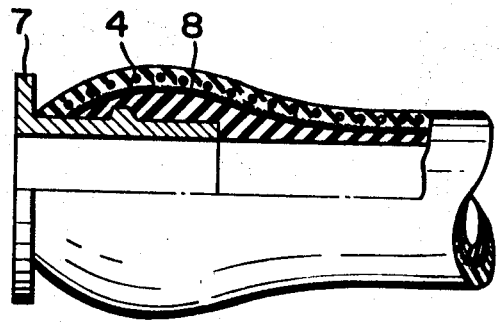
FIG_2
PRIOR ART
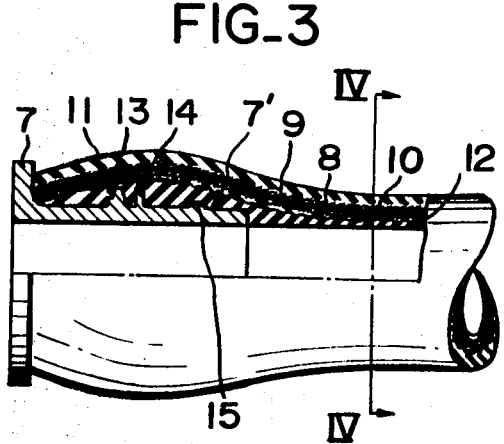
FIG_3
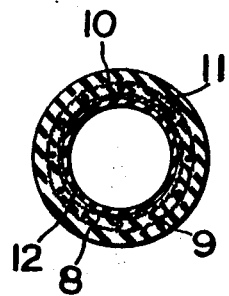
FIG_4

STRANDED WIRE REINFORCED FLUID TRANSPORTING HOSE

This invention relates to an end section of a fluid transporting hose line, which end section is reinforced by stranded wires so as to bear high tension and repeated bending load, such as the tension and bending load experienced at intermediary buoys and tankers moored offshore.

It is common practice to provide a fluid transport means between a tanker moored offshore and a land storage tank located on seashore in order to transport fluid, such as crude petroleum oil, from the tanker to the land storage tank.

In such kind of fluid transport means, the land storage tank is connected to a fixed buoy in the sea through a submerged pipeline. The buoy is connectable to the tanker by means of a fluid transporting hose line which usually floats on the sea.

In a usual fluid transporting hose line of such a cargo system for the oil, a wire reinforced hose element having a spiral-shaped wire reinforcement has been used. It is found that such known kind of hose has a disadvantage in that the hose tends to deform to be a flat shape in the cross section under an action of tensile force and repeated bending force caused by the waves. More particularly, a hose element or a hose portion used at the tanker end or the buoy end is subjected with very high tensile force and also repeatedly occurring bending force under the action of the waves. Therefore, the spiral wire reinforcement in said portion tends to break due to the fatigue of the material of the solid wire. The breakdown of the reinforcement wire then causes further breakdown of the reinforcement cord layer of the hose. Thus the hose finally breaks off completely and becomes unserviceable.

It had been suggested to use a wireless flexible hose at the adjacent portion with the buoy or the tanker. Although such kind of wireless hose has a great flexibility, it has another disadvantage in that it tends to cutoff under an action of a great tensile force by a reason of lack of the tensile strength. In such case the hose line flows away.

Also, it has been suggested to interconnect between the buoy or the tanker and a flange of adjacent hose by means of a wire rope or a chain so as to prevent the loss of the main hose line in case of cutoff of the flexible hose. However, such wire rope or a chain tends to give damages at the outer surface of the hose. Moreover, such jointing means apt to rust by the sea water, therefore a frequent interchange is required.

The present invention has for its object to mitigate above mentioned disadvantages of the known means and to provide an improved hose element suitable for use in such hose line of fluid-transporting object.

The present invention has for its object to mitigate the above-mentioned disadvantages of the known fluid transport means by providing an improved hose line end section for use in fluid transport means.

The hose line end section according to the present invention is featured in that the hose line end section comprises a tubular hose body made of elastomer, a plurality of stranded steel wires embedded in the hose body extending in the axial direction of the hose along the whole length of the hose section in symmetry with each other relative to the axis of the hose, a pair of flanged sleeves secured to the opposite ends of the hose section and connected to the stranded steel wires, and at least one fibrous reinforcing layer provided in the hose body, each of said stranded steel wires having an outside diameter of about 1.0 to 15.0 mm. and consisting of steel strands of 0.1 to 0.5 mm. dia., said fibrous reinforcing layer being disposed in the close proximity of the stranded wires so as to cause the fibrous reinforcing layer to substantially come in contact with the stranded steel wires for holding the stranded steel wires against extending into the rubber body of the hose when the hose is flexed.

The invention will be explained with reference to the accompanying drawings, in which:

FIG. 1 shows an example of off-shore fluid transporting system in which the hose element of the present invention may be applied;

FIG. 2 shows one example of flange portion of the spiral wire reinforced hose of the known type partly in cross section;

FIG. 3 shows flange portion of the hose according to the present invention partly in cross section; and FIG. 4 shows cross sectional view along line IV—IV of Fig. 3.

FIG. 1 shows a typical cargo system for transporting oils to and from a tanker staying at off-shore sight and a storage tank built on the seashore. In this figure, 1 designates a buoy which is connected via a submarine hose 5 to a submerged pipe 6 laid at the bottom of the sea and which in turn leads to a storage tank (not shown). The buoy 1 is connected on the other hand to a tanker $t$ via a fluid transporting hose line 2, 2' and 2. The hose line consisting of a series connection of a plurality of hose portions 2'. As mentioned above the hose portion 2, located at adjacent to the buoy 1 or the tanker $t$ is subjected under frequent bending motions and also very high tensile forces under an action of sea wave.

The present invention is intended to obtain an improved hose portion, particularly, suitable for use in the adjacent portion of the tanker or the buoy such as the hose portion 2 shown in the FIG. 1.

In the FIG. 1, 3 shows above mentioned wire rope or chain to prevent the loss of the main hose line 2' in case of cutoff of the flexible hose.

The present invention is to realize an improved hose portion 2 which needs not to employ such reinforcing wire rope or chain 3.

FIG. 2 shows flange portion of a known spiral wire reinforced hose, in which 7 shows metal flange provided at both ends of the hose portion. 8 shows reinforcement cord layer and 4 shows cross sections of the reinforcement spiral wire.

In such known construction the spiral wire 4 consisting of a solid wire tends to break off under an application of repeating compressive force applied normal to the hose axis. Such break off normally occurs at the sharp edges of the flatly deformed cross section of the hose under an action of high-tensile force and repeated bending actions.

FIG. 3 shows a cross section of hose element according to one embodiment of the present invention, in which 7 is a metal flange which is to be provided at the both ends of the hose 2. 12 is an inner tube which is preferably made of oil-proof natural or synthetic rubber and is rigidly attached with nipple 7' of the flange 7. 8 is an inner reinforcement cord layer and 10 is an outer reinforcement cord layer. 11 is an outer cover consisting of rubber, which is preferably made of weatherproof natural or synthetic rubber. According to the present invention a plurality of stranded wires 9 are inserted between the reinforcement cord layers 8 and 10 along the axial direction. FIG. 4 is the cross section of the hose which contains 12 stranded wires 9 disposed symmetrically about the hose axis, but this is just an illustration and the invention is not limited to a certain number of reinforcement wires.

The application of reinforcement lay 8 or 10 and the stranded wire 9 in the longitudinal direction of the hose may afford a sufficient strength for fixing the hose with the flange nipple 7'. However, when more strength between the hose and the flange nipple 7' is required, the end of the stranded wire 9 may be fixed by turning around an extended ridges 13 and 14 of flange nipple 7'. In this case ridges 13 and 14 act to hold the stranded wire end and to keep the spacing of the stranded wire 9 respectively.

The stranded wire 9 consists of a plurality of thin wire elements, therefore, contrary to the conventional solid spiral wire reinforcement, it has a high-flexibility and high-tensile strength. Therefore, it is durable for the high-tensile force and the frequent bending movement. The thin wire element is preferably made of steel.

Owing to the high flexibility and high-tensile strength the transporting hose element according to the present invention is sufficiently durable for the hard working condition under the repeated bending action of the waves and is sufficient to avoid possible breakdown.

Moreover, the safety-jointing means for preventing the loss of the hose line is not required by using a reinforced hose element according to the present invention. The wire element of the stranded wire used in accordance with the present invention may have a diameter of about 0.1 to 0.5 mm., more preferably about 0.2 to 0.4 mm. The diameter of a stranded wire is about 1.0 to 15.0 mm., more preferably about 2.0 to 12.0 mm. The wire element is preferably a galvanized steel wire. The number of the stranded wires inserted in the hose body may be decided by taking into consideration for strength of stranded wire and the working conditions.

Various modifications and alternatives may be possible not aparting from the scope of the present invention.

What is claimed is:

1. A hose line end section, for marine applications, comprising a tubular hose body made of elastomer, a plurality of stranded steel wires embedded in the hose body extending in the axial direction of the hose along the whole length of the hose section in symmetry with each other relative to the axis of the hose, a pair of flanged sleeves secured to the opposite ends of the hose section and connected to the stranded steel wires, and at least one fibrous reinforcing layer provided in the hose body, each of said stranded steel wires having an outside diameter of about 1.0 to 15.0 mm. and consisting of steel strands of 0.1 to 0.5 mm. diameter, said fibrous reinforcing layer being disposed in the close proximity of the stranded wires so as to cause the fibrous reinforcing layer to substantially come in contact with the stranded steel wires for holding the stranded steel wires against extending into the rubber body of the hose when the hose is flexed.

2. A hose line end section according to claim 1, wherein two fibrous reinforcement layers are provided to sandwich said stranded wires.

3. A hose line end section according to claim 1, wherein the stranded wire element is formed by galvanized steel wires.